US008462661B2

(12) United States Patent
Phillips et al.

(10) Patent No.: US 8,462,661 B2
(45) Date of Patent: Jun. 11, 2013

(54) AUTO-DISCOVERY IN A SWITCH

(75) Inventors: Melvin Richard Phillips, Carlina Beach, NC (US); Jefferson Logan Holt, Sr., Wake Forest, NC (US); William C. Meador, Raleigh, NC (US)

(73) Assignee: ADC DSL Systems, Inc., Shakopee, MN (US)

( * ) Notice: Subject to any disclaimer, the term of this patent is extended or adjusted under 35 U.S.C. 154(b) by 1344 days.

(21) Appl. No.: 12/027,617

(22) Filed: Feb. 7, 2008

(65) Prior Publication Data
US 2009/0082047 A1 Mar. 26, 2009

Related U.S. Application Data

(60) Provisional application No. 60/974,322, filed on Sep. 21, 2007.

(51) Int. Cl.
H04L 12/28 (2006.01)

(52) U.S. Cl.
USPC ............ 370/254; 370/236; 709/217; 709/244

(58) Field of Classification Search
USPC ................ 370/229, 236, 237, 241, 254, 255, 370/351, 352, 343, 465, 401; 709/209, 217, 709/218, 220, 222, 244
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmüller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Lee | |
| 5,243,598 A | 9/1993 | Lee | |

(Continued)

FOREIGN PATENT DOCUMENTS

| | | |
|---|---|---|
| EP | 0391597 | 10/1990 |
| JP | 07079223 | 3/1995 |
| KR | 20070014313 | 2/2007 |
| WO | 9115927 | 10/1991 |

OTHER PUBLICATIONS

International Searching Authority, "International Search Report", Mar. 13, 2009, Published in: WO.

(Continued)

Primary Examiner — Robert Scheibel
Assistant Examiner — Ajay Cattungal
(74) Attorney, Agent, or Firm — Fogg & Powers LLC

(57) ABSTRACT

A wireless communication system comprises a hub; a plurality of radio access nodes; a plurality of forward devices that produce digitized versions of downstream analog radio frequency signals; a plurality of reverse devices that produce reconstructed versions of upstream analog radio frequency signals; a plurality of transport interfaces to couple the hub to the plurality of communication links; and a switch having a plurality of ports. The plurality of ports comprises a plurality of input ports and plurality of output ports. The switch listens for a device identifier on at least one of the plurality of input ports to determine if a device is communicatively coupled to the input port. The switch transmits a port identifier over at least one of the plurality of output ports and searches a shared data structure to determine if a device is communicatively coupled to the output port.

43 Claims, 8 Drawing Sheets

U.S. PATENT DOCUMENTS

| | | | |
|---|---|---|---|
| 5,321,849 | A | 6/1994 | Lemson |
| 5,339,184 | A | 8/1994 | Tang |
| 5,568,525 | A | 10/1996 | de Nijs et al. |
| 6,594,148 | B1 | 7/2003 | Nguyen et al. |
| 7,016,193 | B1 | 3/2006 | Jacques et al. |
| 2004/0008614 | A1* | 1/2004 | Matsuoka et al. ............ 370/203 |
| 2004/0120344 | A1* | 6/2004 | Sato et al. .................... 370/465 |
| 2005/0002390 | A1 | 1/2005 | Kim et al. |
| 2005/0132026 | A1* | 6/2005 | Govil ............................ 709/220 |
| 2006/0221865 | A1* | 10/2006 | Hawbaker et al. ............ 370/255 |
| 2007/0211689 | A1* | 9/2007 | Campero et al. .............. 370/351 |
| 2008/0049627 | A1* | 2/2008 | Nordin .......................... 370/241 |
| 2008/0155073 | A1* | 6/2008 | Swain ............................ 709/222 |
| 2008/0285457 | A1* | 11/2008 | Larson et al. ................. 370/237 |

OTHER PUBLICATIONS

"5×12 Unshielded Cable Connector Kit", "www.fciconnect.com", Aug. 2005, pp. 1-3, Publisher: FCI.

"Cisco ONS 15310-CL Sonet Multiservice Platform", "http://www.cisco.com/en/US/products/hw/optical/ps2001/products_data_sheet0900aecd801ba7f7.html", 2004, pp. 1-7, Publisher: Cisco Systems, Inc.

"Cisco ONS 15310-MA Sonet Multiservice Platform", "http://www.cisco.com/en/US/products/hw/optical/ps2001/products_qanda_item0900aecd80404d1c.shtml", 2001, pp. 1-4, Publisher: Cisco Systems, Inc.

"3.00mm (.118") Micro-Fit 3.0, BMI Panel-To-Panel Receptacle", "www.molex.com/product/pcb/microfit/microfit.html", 2005, p. 1, Publisher: Molex.

"RJ-45 Snagless Boot—Bag of 100", "http://www.lanshack.com/RJ-45-Snagless-Boot---Bag-of-100-P1341C56.aspx", 2007, Publisher: Atcom Inc.

"Power and Voice/Data Accessories", "Boardgames Pricelist", Jan. 2007, Publisher: www.specfurniture.com.

"DC Fan Motors—San Ace 40mm", "www.sanyodenki.co.jp", 2004, pp. 1-2, Publisher: Sanyo Denki.

"Product Description Tripp Lite Network Connector", "http://www.etech4sale.com/Tripp_Lite_Network_connector_-/N031-050/partinfo-id-125186.html", 2007, p. 1, Publisher: Etech4sale.com.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

\* cited by examiner

AUTO-DISCOVERY IN A SWITCH

CROSS-REFERENCE TO RELATED APPLICATIONS

This application is related to co-pending U.S. provisional patent application Ser. No. 60/974,322, filed Sep. 21, 2007 entitled "AUTO-DISCOVERY IN A SWITCH", hereby incorporated herein by reference, and referred to herein as the "'322 Application". The present application hereby claims priority, under 35 U.S.C. §119(e), to U.S. Provisional Patent Application No. 60/974,322.

This application is related to co-pending U.S. patent application Ser. No. 11/692,449, filed on Mar. 28, 2007, entitled "PROGRAMMABLE HIGH SPEED CROSSBAR SWITCH," hereby incorporated herein by reference, and referred to herein as the "'449 Application."

This application is related to co-pending U.S. patent application Ser. No. 11/012,868, filed on Dec. 14, 2004, entitled "SYSTEM AND METHOD FOR RETRANSMISSION OF DATA," hereby incorporated herein by reference, and referred to herein as the "'868 Application."

This application is related to co-pending U.S. patent application Ser. No. 11/098,941, filed on Apr. 5, 2005, entitled "MULTI-PROTOCOL DISTRIBUTED WIRELESS SYSTEM ARCHITECTURE," hereby incorporated herein by reference, and referred to herein as the "'941 Application."

BACKGROUND

As additional service demands are placed on telecommunications systems, replacement of time-sensitive operations is occurring with electronically configurable operations (for example, programmable electronic equipment). A crossbar switch is one example. A typical crossbar switch has a matrix of switches between a set of inputs and a set of outputs. If the switch has A inputs and B outputs, then a crossbar has a matrix with A×B "cross-points" or places where the "bars cross."

Increasingly, these additional service demands involve operating at optimal speeds to accommodate transmissions of voice and data traffic on the system. Any potential routing changes of the transmissions typically require reconfiguration (that is, rerouting) of multiple telecommunications signals through the crossbar switch. For example, removal and/or insertion of devices from the crossbar typically introduce additional manual configuration requirements to configure new communication paths based on the addition or removal of devices. These manual configuration requirements translate into increased operating costs to ensure that one or more desired configurations are achieved.

SUMMARY

In one embodiment, a wireless communications system is provided. The wireless communication system comprises a hub; a plurality of radio access nodes, wherein each of the plurality of radio access nodes is coupled to the hub via a respective communication link. The hub comprises a plurality of forward devices that produce digitized versions of downstream analog radio frequency signals received from a plurality service provider interfaces; a plurality of reverse devices that produce reconstructed versions of upstream analog radio frequency signals for transmission to the plurality of service provider interfaces based on digitized version of the upstream analog radio frequency signals received from the plurality of radio access nodes; a plurality of transport interfaces to couple the hub to the plurality of communication links; and a switch having a plurality of ports communicatively coupled to the hub forward devices, the hub reverse devices, and the transport interfaces, wherein the switch selectively routes the digitized versions of the downstream analog radio frequency signals and the digitized versions of the upstream analog radio frequency signals among the plurality of ports. The plurality of ports comprises a plurality of input ports and plurality of output ports; wherein the switch listens for a device identifier on at least one of the plurality of input ports to determine if a device is communicatively coupled to the at least one of the plurality of input ports. The switch transmits a port identifier over at least one of the plurality of output ports and, thereafter, searches a shared data structure to determine if a device is communicatively coupled to the at least one of the plurality of output ports.

DRAWINGS

DETAILED DESCRIPTION

Figure 1:
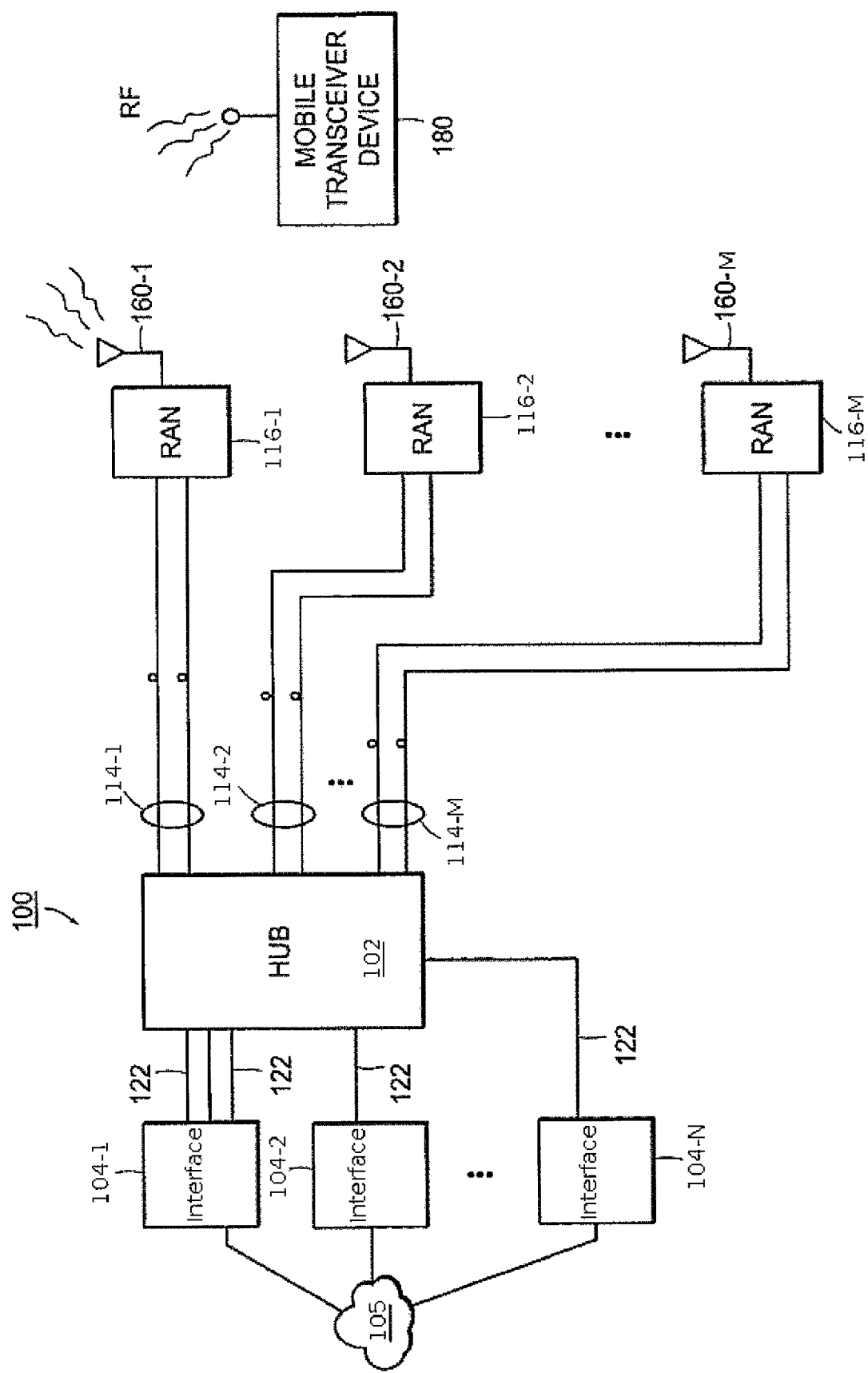
FIG. 1 is a block diagram of one embodiment of a telecommunications system.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual acts may be performed. The following detailed description is, therefore, not to be taken in a limiting sense.

FIG. 1 is a block diagram of a communication system 100 for transmitting and receiving information between a service provider interface and a wireless mobile transceiver device. As shown, service provider interfaces 104-1 to 104-N are coupled to hub 102 via corresponding cables 122. Typically, each interface 104-1 to 104-N is coupled to hub 102 via one or more coaxial cables carrying analog RF (radio frequency) signals. Consequently, RF signals transmitted on a coaxial cable can be transmitted in either direction between hub 102 and interfaces 104-1 to 104-N. Interfaces 104-1 to 104-N provide respective connections to network 105. Interfaces 104-1 to 104-N comprise, for example, one or more of a base transceiver station (BTS), a repeater, a bi-directional amplifier, a base station hotel or other appropriate interface for one or more service provider communications networks.

In a conventional system, each service provider interface is coupled directly to a respective antenna device. However, in the embodiment shown in FIG. 1, an RF transport system is used to couple the service provider interfaces 104-1 to 104-N to a set of antennas 160-1 to 160-M. The RF transport system comprises a hub 102 and a set of radio access nodes (RAN) 116-1 to 116-M. Generally, hub 102 provides hardware and software functions to reformat the RF signals received over cables 122 for re-transmission to a target such as one or more the RANS 116-1 to 116-M.

In the downstream or forward direction from the hub 102 towards the RANS 116-1 to 116-M, hub 102 downconverts RF signals received from each of the interfaces 104-1 to 104-N to a respective intermediate frequency (IF) signal. Each such IF signal is then converted to a respective digital IF signal, which is routed to one or more links 114-1 to 114-M. The digital IF signals received at each link 114-1 to 114-M are combined and formatted according to a serial transport protocol (for example, by assembling appropriate frames including overhead bits to aid in system configuration and fault detection) for transport over that respective link 114-1 to 114-M to a respective RAN 116-1 to 116-M. Links 114-1 to 114-M are implemented as fiber optic cable in this embodiment.

Each of the RANs 116-1 to 116-M receives the combined digital IF signals (and any associated overhead bits) and separates the combined digital IF signals. Each of the RANs 116-1 to 116-M converts each of the separated digital IF signals into a respective analog IF signal, which is upconverted to a respective analog RF signal. The analog RF signals are then combined, amplified, and radiated from a respective remote antenna device 160-1 to 160-M coupled to the RAN. In this way, the corresponding analog RF signal received at the hub 102 can be reproduced at a target radio access node 116. Hence, it appears as though an original RF signal received from an interface 104 is seamlessly connected to a corresponding remote antenna device 160. A similar process also occurs to transport signals in the reverse or "upstream" direction from each of the RANs 116 to hub 102 and the interfaces 104-1 to 104-N (that is, the system 100 is bi-directional).

One notable advantage of the present invention is to enable a base station "farm" "hotel," i.e., multiple base stations located at a common location. In previous applications, a base station farm would utilize antennas disposed on a local base station tower. Often such towers are unsightly because of their size. Embodiment of the system 100 of FIG. 1 enable radio access nodes 116 to be distributed at remote locations such as telephone poles. Thus, wireless communications can be supported using antenna devices disposed on existing infrastructure so that distributed antenna devices blend in with the environment. In other applications, the system 100 of FIG. 1 is used in other ways.

Communication system 100 can be integrated to broadband transceiver and spread spectrum technologies that provide wireless telephony and network operators with substantial cost savings, deployment advantages, and performance benefits that significantly enhance the quality, reliability, and availability of their communications services.

Furthermore, communication system 100 can be a multi-frequency, multi-protocol wireless access network providing cellular, PCS and wireless data coverage via a distributed fiber access system. In specific applications, communication system 100 can be modified to accommodate current wireless protocols such as TDMA, CDMA, GSM, MEN and iDEN as well as next generation 3G wireless protocols such as GPRS, 1XRTT, EDGE, 3XRTT, and W-CDMA. For example, system 100 can operate in the licensed cellular (800 MHz) and PCS (1900 MHz) bands and be forward compatible to support international frequency bands of 900 MHz and 1800 MHz, and unlicensed frequency bands, including 700 MHz, ISM (900/2400 MHz), MMDS (2.8 MHz) and UUNII (5.8 GHz).

Figure 2:
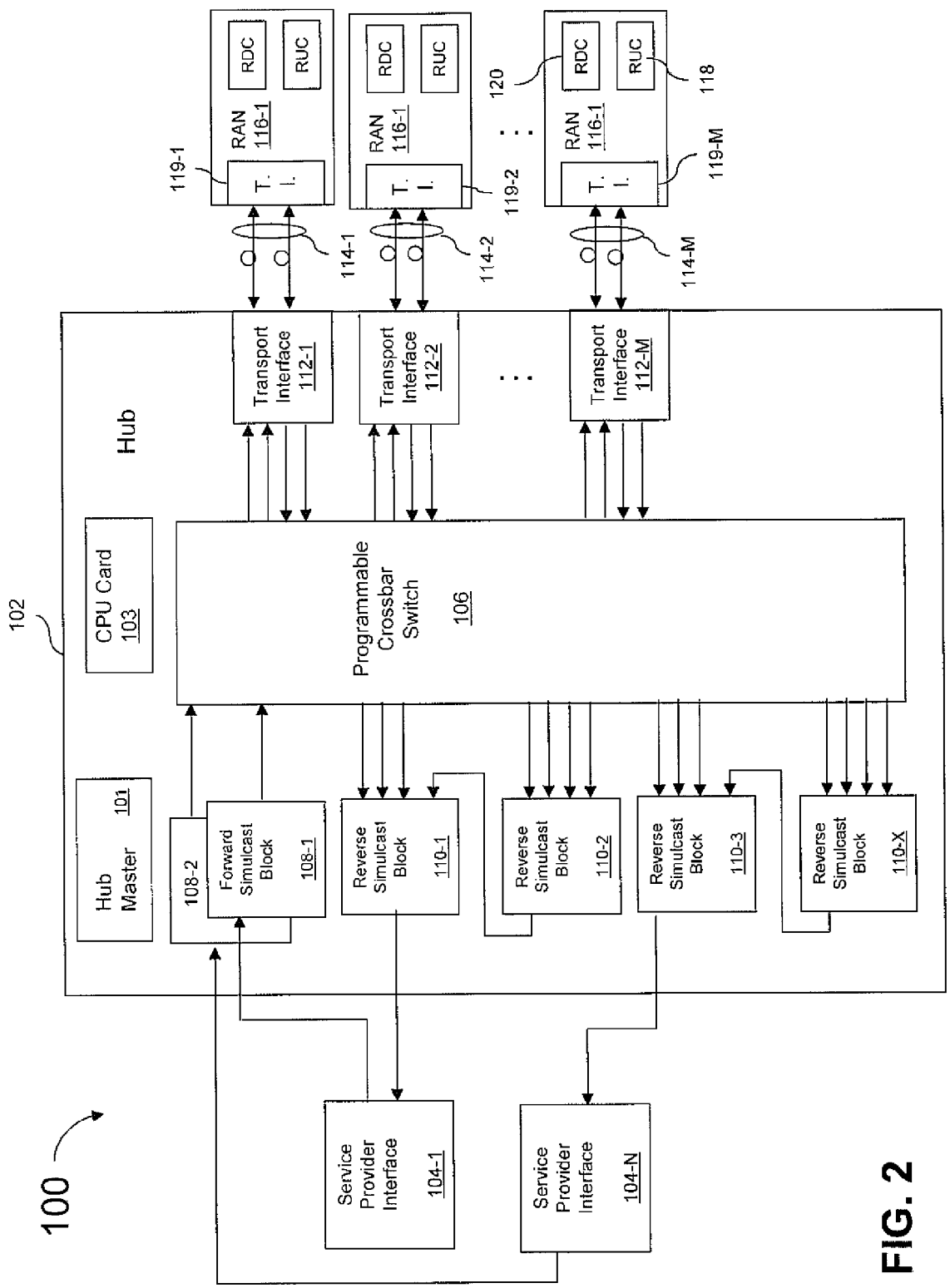
FIG. 2 is a more detailed block diagram of the communications system shown in FIG. 1.

FIG. 2 is a more detailed block diagram of the communications system 100. The system 100 transports communications signals for a plurality of services offered by one or more service providers and extends the coverage of these systems into a plurality of environments (for example, within an enclosed structure) through at least one programmable crossbar switch 106 in a hub 102. For purposes of explanation, only one service provider interface 104 is shown. However, it is to be understood that multiple interfaces 104 can be used in other embodiments.

The hub 102 comprises a plurality of devices that perform the processing described here as occurring in the hub 102. The hub 102 comprises at least one forward device 108 that produces a digitized version of a downstream analog radio frequency signal. More specifically, the hub 102 also comprises at least one forward device 108 (also referred to here as a "forward simulcast block 108" or "FSB 108") for each service provider interface 104 to which the hub 102 is coupled. In the embodiment shown in FIG. 2, only one interface 104 and one corresponding forward simulcast block 108 are shown for illustrative purposes (though it is to be understood that other numbers can be used in other embodiments). In such an embodiment, each forward simulcast block 108 downconverts a downstream analog RF signals received from the respective service provider interface 104 into downstream analog IF signals and then digitizes the downconverted downstream analog IF signals to produce downstream digital IF signals. The downstream digital IF signals output by the various forward simulcast blocks 108 are routed to one or more of the transport interfaces 112-1 to 112-M by a programmable crossbar switch 106. As described above in connection with FIG. 2, each of the transport interfaces 112-1 to 112-M combine and format the downstream digital IF signals for transmission over a respective link 114-1 to 114-M to a respective RAN 116-2. Each RAN 116-1 to 116-M comprises a respective transport interface 119-1 to 119-M that serves as an interface to the respective link 114-1 to 114-M to which that RAN is coupled and that separates the combined downstream digital IF signals received from such link. Each RAN 116-1 to 116-M also comprises a respective forward device 118 that produces a reconstructed downstream analog radio frequency signals from the digitized versions of the downstream analog radio frequency signals received by the respective transport interface 116-1 to 116-M. More specifically, in the embodiment shown in FIG. 1, a respective forward device 118 (also referred to here as a "RAN upconverter" 118 or "RUC" 118) that, for each of the separated downstream digital IF signals provided to it, converts that downstream digital IF signal into a respective downstream analog IF signal and upconverts the downstream analog IF signal to a respective downstream analog RF signal. The downstream analog RF signals are then combined, amplified, and radiated from a respective remote antenna device 160-1 to 160-M (not shown in FIG. 2) coupled to the respective RAN.

In the upstream or reverse direction, upstream analog RF signals are received at each RAN 116-1 to 116-M via a respective remote antenna device 160-1 to 160M. Each RAN 116-1 to 116-M also comprises a reverse device 120 to produce digitized versions of the upstream analog radio frequency signals received at the respective RAN 116-1 to 116-M for transmission by the respective transport interface 119-1 to 119-M to the hub 102 over the respective communication link 114-1 to 114-M. More specifically, the respective forward device 120 (also referred to here as "RAN downconverter" 120 and "RDC" 120) in each RAN 116-1 to 116-M downconverts each of the upstream analog RF signals received at the RAN into respective upstream analog IF signals and then digitizes the upstream analog IF signals to produce respective upstream digital IF signals. The respective transport interfaces 119-1 to 119-M in each RAN 116-1 to 116-M combines and formats the respective upstream digital IF signals for transmission over a respective link 114-1 to 114-M to a respective transport interface 112-1 to 112-M of the hub 102. Each transport interface 112-1 to 112-M of the hub 102 separates the combined upstream digital IF signals received from a respective link 114-1 to 114-M and directs the separated upstream digital IF signals to respective ports of the programmable crossbar switch 106. The programmable crossbar switch 106 routes each of the separated digital IF signals to one or more reverse devices 110. Each reverse device 110 (also referred to here as a "reverse simulcast block" 110 or "RSB" 110) produces reconstructed versions of upstream analog radio frequency signals based on the digitized versions of the upstream analog radio frequency signals received at that reverse device 110.

More specifically, each RSB 110 (only four of which are shown in FIG. 2 for ease of illustration), for each of the separated upstream digital IF signals routed to it, converts that upstream digital IF signal into a respective upstream analog IF signal and upconverts the upstream analog IF signal to a respective upstream analog RF signal. The upstream analog RF signals produced by the reverse simulcast block 110 are combined. The combined upstream analog RF signals are either output to a service provider interface 104 or to another reverse block. If the combined upstream analog RF signals are output to another reverse simulcast block 110, the receiving reverse simulcast block (for example, reverse simulcast block 110-1 in FIG. 2) combines the received combined upstream analog RF signals (for example, the combined upstream RF signals output by reverse simulcast block 110-2) with the combined upstream RF signals that it produces, resulting upstream RF analog signal being output to a service provider interface 104. This chaining of reverse simulcast blocks 110 may be done, for example, to process upstream diversity signals and/or to process separate RF frequency bands using separate reverse simulcast blocks 110.

Transport interfaces 112-1 to 112-M and 119-1 to 119-M are implemented as Synchronous Optical Network (SONET) interfaces in this embodiment (including, for example, appropriate SONET framers and deframers, electrical-to-optical interfaces, and optical-to-electrical interfaces). Moreover, in the embodiments shown in FIGS. 1 and 2, each of the links 114-1 to 114-M is implemented using a pair of fiber links; in other embodiments, the links are implemented in other ways, for example, using a single fiber and wave-division multipexing (WDM) for each link and/or using other topologies such as a ring implementing using add-drop-multiplexers.

Hub 102 also comprises a hub master 101. Hub master 101 is a central processing unit (CPU) card configured to run networking processes as well as manage operation of devices in the hub 102 (for example, FSB 108). In some embodiments, hub 102 also includes one or more additional CPU cards 103 which manage operation of devices similar to hub master 101, but do not run the networking processes run by hub master 101. For example, hub master 101 is configured to run a networking process (for example, a dynamic host configuration protocol (DHCP) process) to assign IP addresses to other hub CPU cards 103 and to RANs 116-1 to 116-M whereas CPU cards 103 do not perform this process in such an embodiment.

Hub master 101 also maintains a master copy of one or more management information base (MIB) objects which contain management information for system 100. A MIB object is a memory-mapped file, which enables the file to be accessed and shared between devices. In addition, each of the radio access nodes 116-1 to 116-M, CPU cards 103, and crossbar switch 106 maintains a local copy of one or more related MIB objects. For example, hub master 101 maintains a hub node MIB object and a RAN node MIB object. The hub node MIB object is related to a network node MIB object in CPU card 103 while the RAN node MIB object is related to network node MIB object in each of RANs 116-1 to 116-M. For example, network node MIB objects in each RAN 116-1 to 116-M contain management information such as the RAN IP address, RAN device type, and index ID. In addition, a bus scanner process in each of RANs 116-1 to 116-M detects the presence or absence of hardware connected to RANs 116-1 to 116-M, such as when receiving a pathtrace or other identification signal. The results of the bus scanner process are stored in a bus scanner MIB object and passed to a related MIB object maintained by hub master 101.

Information in the shared MIB objects is shared between hub master 101, CPU cards 103, and RANs 116-1 to 116-M. In particular, a channel on each of links 114-1 to 114-M is reserved for bidirectional IP communication which is used to share information in the shared MIB. That is, a portion of the available bandwidth that is provided over the links 114-1 to 114-M is reserved for such IP communication. Hub master 101 knows the IP address of each RAN 116-1 to 116-M and CPU cards 103. Hence, hub master 101 periodically requests the status of devices managed by CPU cards 103 and RANs 116-1 to 116-M as well as communicates changes to the CPU cards 103 and RANs 116-1 to 116-M. However, devices in system 100 appear local to hub master 101. In particular, hub master 101 does not have information regarding the physical paths which connect hub master 101 to RANs 116-1 to 116-M and devices in hub 102.

As noted above, system 100 communicatively couples service provider interface 104 to one or more RANs 116-1 to 116-M to provide services to the RANs 116-1 to 116-M. In one implementation, the service provider interface 104 provides an interface to a plurality of services from one or more service providers such as, but not limited to, digital cellular service, Personal Communication Services (PCS), Specialized Mobile Radio (SMR) services, video services, wireless broadband internet services, and other appropriate telecommunication services. Service provider interface 104 can be implemented as a BTS, repeater, bi-directional amplifier, base station hotel, etc. Each service provided over service provider interface 104 is also referred to herein as a "tenant." Hub master 101 maintains a tenant/RAN MIB object containing information regarding tenant/RAN connections, such as a tenant identifier (ID), RAN identifier, and connection status.

Figure 3:
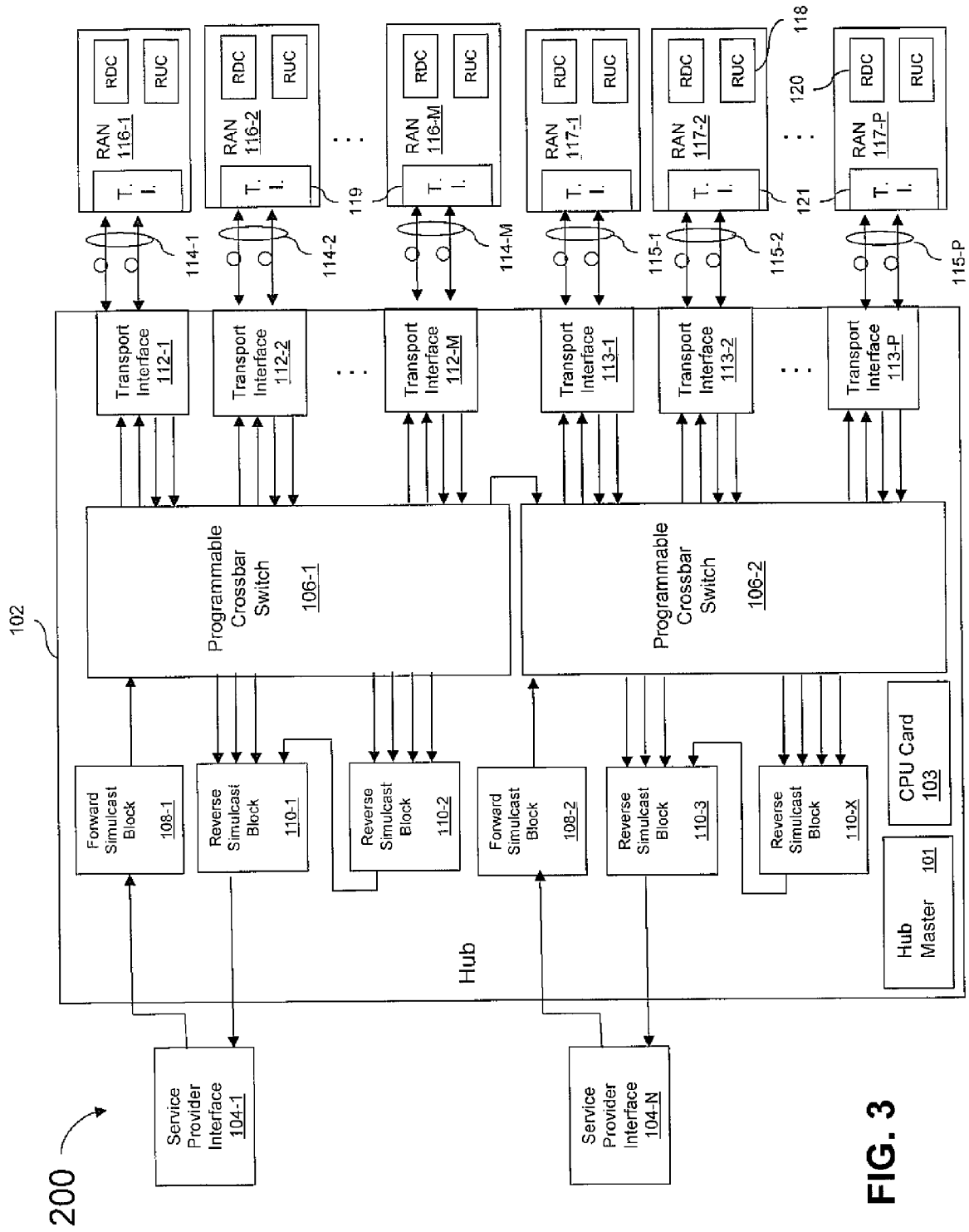
FIG. 3 is a block diagram of another embodiment of a telecommunications system.

The system 100 uses digital transport over the links 114-1 to 114-M (for example, optical fiber). The links 114-1 to 114-M are represented as optical fiber in FIG. 2 by way of example and not by way of limitation. In other embodiments, the links 114-1 to 114-M comprises one or more of free space optics, high speed copper and other appropriate wired, wireless, and optical communication media. By connecting one or more additional programmable crossbar switches 106 in series (for example, as shown in FIG. 3), additional radio access nodes (radio access nodes 117 in FIG. 3) are serviceable by the hub 102. The one or more additional programmable crossbar switches 106 allow the hub 102 to supply one or more telecommunications services over a substantially larger coverage area.

As described in the '449 Application, the routing of downstream digital IF signals and upstream digital IF signals among the FSBs 108, RSBs 110, and transport interfaces 112-1 to 112-M is performed by the programmable crossbar switch 106 and can be configured remotely and automatically via an external control application. The programmable crossbar switch 106 eliminates the need for the manual patching of the telecommunication signals (that is, the telecommunications cables) for signal path rerouting. In addition, crossbar switch 106 is configured to automatically discover devices (such as radio access nodes 116, FSB 108, and RSB 110) that are communicatively coupled to input and/or output ports of the crossbar switch 106. In particular, crossbar switch 106 scans input and output ports and stores information regarding discovered nodes and corresponding port numbers in a data structure (such as an internal table) used in establishing communication paths and switching communications. Details of crossbar switch 106 and the automatic discovery of nodes and communication paths are discussed below.

Furthermore, although only one crossbar switch 106 is shown in FIG. 2, it is understood that the system 100 is capable of accommodating any appropriate number of the programmable crossbar switches 106 in a single system 100. For example, FIG. 3 is a block diagram of an alternative embodiment of a system 300. The embodiment of the electronic system 300 shown in FIG. 3 includes at least two programmable crossbar switches 106 with associated transport interfaces 112 and 113, and radio access nodes 116 and 117, which have respective transport interfaces 119 and 121. The two programmable crossbar switches 106 are individually referenced in FIG. 3 as programmable crossbar switches 106-1 and 106-2, respectively.

In the example embodiment shown in FIG. 3, the system 300 further comprises transport interfaces 112-1 to 112-M coupled to the programmable crossbar switch 106-1, and transport interfaces 113-1 to 113-P coupled to the programmable crossbar switch 106-2. The transport interfaces 112-1 to 112-M are individually coupled to radio access nodes 116-1 to 116-M via links 114-1 to 114-M, respectively. Similarly, the transport interfaces 113-1 to 113-P are individually coupled to radio access nodes 117-1 to 117-P via links 115-1 to 115-P, respectively. In the example embodiment of FIG. 3, the programmable crossbar switches 106-1 and 106-2 are connected in series. As discussed above, by using more than one crossbar switch 106, additional radio access nodes are serviceable by the hub 102 allowing the hub 102 to supply one or more telecommunication services over a substantially larger coverage area.

Figure 4:
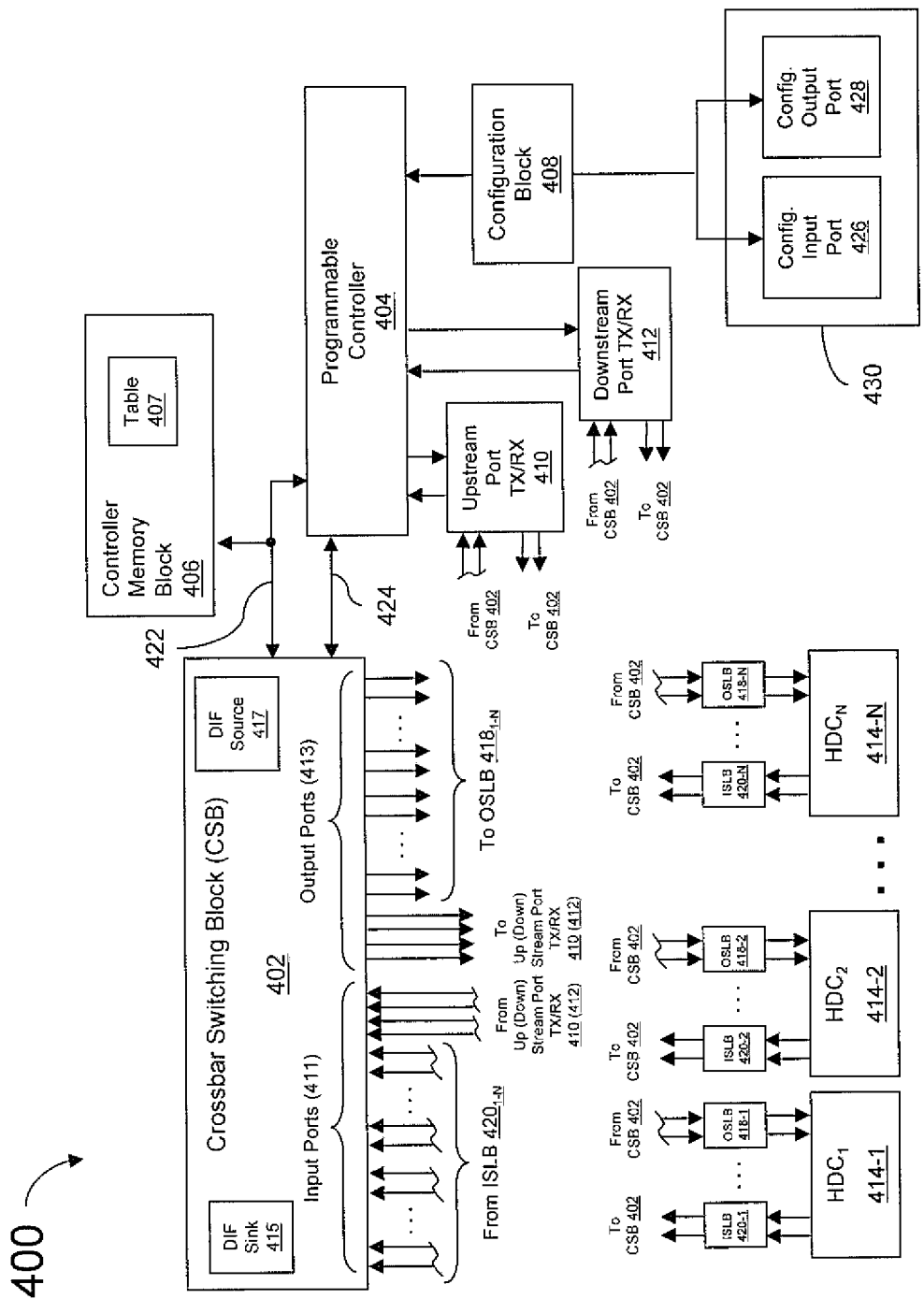
FIG. 4 is a block diagram of one embodiment of an electronic digital signal switching device.

FIG. 4 is a block diagram of an electronic digital signal switching device 400, representative of the programmable high speed crossbar switch 106 in the system 200. The device 400 comprises a crossbar switching block (CSB) 402 responsive to a programmable controller 404 (via a control interface connection 424), a controller memory block 406, and a configuration block 408 in communication with the programmable controller 404. Programmable controller 404 comprises at least one of a microcontroller, an application-specific integrated circuit (ASIC), a field-programmable gate array (FPGA), a field-programmable object array (FPOA), and a programmable logic device (PLD). Moreover, CSB 402 comprises at least one of a microcontroller, an ASIC, an FPGA, an FPOA, and a PLD. Controller memory block 406 is responsive to programmable controller 404 and CSB 402 via a memory interface connection 422.

In one implementation, controller memory block 406 stores a plurality of digital signal path configuration commands from the configuration block 408. The controller memory block 406 comprises at least one of a FLASH memory and an electrically-erasable programmable read-only memory (EEPROM). The programmable controller 404 and the CSB 402 are responsive to the plurality of digital signal path configuration commands received by the configuration block 408, as discussed in further detail below. In one implementation, the configuration block 408 comprises an inter-IC (integrated circuit, or 12C) bus that transfers the plurality of digital signal path configuration commands to the programmable controller 404.

The configuration block 408 receives the plurality of digital signal path configuration commands from an external control connection 430. The external control connection 430 comprises a configuration input port 426 and a configuration output port 428. In one implementation, the configuration input port 426 receives the plurality of digital signal path configuration commands from a single source (for example, a hub master CPU such as hub master 101 in FIG. 2). In at least one alternate implementation, the configuration input port 426 receives the plurality of digital signal path configuration commands from an additional daisy chained crossbar switch. A daisy chained crossbar switch is another crossbar switch serially connected to switch 400 through the external control connection 430. In such an implementation, the configuration output port 428 provides additional digital signal path configuration commands from the programmable controller 404 to one or more additional daisy chained crossbar switches for routing of additional digital signals (as discussed above with respect to the system 300 of FIG. 3). As discussed above with respect to the system 300, stacking the switches provides additional signal routing points to substantially increase coverage (that is, increase system capacity) of a system.

The switch 400 further comprises high density connectors (HDCs) 414-1 to 414-N coupled to the CSB 402. The switch 400 also comprises an upstream port transmit and receive (TX/RX) block 410 and a downstream port TX/RX block 412. Both the upstream port TX/RX block 410 and the downstream port TX/RX block 412 are responsive to the programmable controller 404. The upstream and downstream port TX/RX blocks 410 and 412 are coupled to input ports 411 and output ports 413 of CSB 402, as illustrated in FIG. 4. In one implementation, each of the upstream port TX/RX block 410 and the downstream port TX/RX block 412 comprise SERializer/DESerializer (SERDES) devices for serializing or deserializing signals to (from) other daisy chained crossbar switches. The upstream port TX/RX block 410 transmits (receives) digital signals to (from) one or more additional switches stacked upstream from the switch 400. Similarly, the downstream port TX/RX block 412 transmits (receives) digital signals to (from) one or more additional switches stacked downstream from the switch 400.

In addition, controller memory block 406 comprises any appropriate medium for storage of data and/or machine readable instructions. Such media include, but are not limited to, non-volatile memory devices including semiconductor memory devices such as EPROM, EEPROM, or flash memory devices; magnetic disks such as internal hard disks or removable disks (e.g., floppy disks); memory integrated within programmable devices such as a microcontroller, ASIC, FPGA, FPOA, and PLD; magneto-optical disks; CDs, DVDs, or other optical storage disks; RAM, and other like media. In this embodiment, controller memory block 406 stores a data structure 407 which is used to identify communication paths between elements of a system such as system

100. Data structure 407 can be any appropriate type of data structure including but not limited to, an internal table and a MIB object. Programmable controller 404 updates and maintains the data structure 407 as devices (for example, RANs 116 in FIG. 2) are connected to CSB 402 or disconnected from CSB 402.

Although input ports 411 and output ports 413 are shown as separate ports in this example, it is to be understood that, in other embodiments, each port in CSB 402 can be an input or an output port based on the device connected to the CSB 402 and the configured transmission direction. The plurality of input ports 411 and the plurality of output ports 413 are in communication with the HDCs 414-1 to 414-N and provide one or more digital signal paths through the device 400 for transmissions of digital signals within a telecommunication system such as system 100.

The plurality of input ports 411 and the plurality of output ports 413 are coupled to the HDCs 414-1 to 414-N by input (output) signal logic blocks $320_1$ ($318_1$) to $320_N$ ($318_N$). The input (output) signal logic blocks $320_1$ ($318_1$) to $320_N$ ($318_N$) comprise emitter-coupled, low voltage differential signaling (LVDS) logic for high-speed serial data transmission. The plurality of input ports 411 and output ports 413 of CSB 402 comprise a switching matrix between the inputs and the outputs on the HDCs 414-1 to 414-N. By way of example and not by way of limitation, for a number of outputs S on each of the OSLBs $418_1$ to $418_N$ and a number of inputs T for each of the ISLBs $420_1$ to $420_N$, the switching matrix for the programmable crossbar switch 400 comprises S×T connection points.

In addition to switching digital signal paths, switch 400 also automatically detects devices connected to input ports 411 and output ports 413. In particular, programmable controller 404 initiates and manages scanning of input ports 411 and output ports 413 to detect devices connected thereto. In particular, in this exemplary embodiment, CSB 402 comprises an internal digital intermediate frequency (DIF) sink 415 and an internal DIF source 417. When CSB 402 is scanning input ports 411 for undiscovered devices, DIF sink 415 is coupled to the input ports 411, one at a time, to listen for a signal containing a device ID. When CSB 402 is scanning output ports 413 for undiscovered devices, DIF source 417 is coupled to output ports 413, one at a time, to transmit a signal containing a timestamp and the crossbar identifier of crossbar 400. When a device is identified or discovered as being connected to one of input ports 411 or output ports 413, programmable controller 404 updates the data structure 407. For example, programmable controller 404 stores one or more of the port number, the port direction (input/output), the port status (connected/unconnected), the connected device type, and the device ID.

The data structure 407, in this embodiment, is a local management information base (MIB) object related to a MIB object in a hub master (for example, hub master 101) for sharing configuration information between switch 400 and the hub master. The data regarding discovered nodes is used by the hub master and switch 400 to automatically discover communication paths and establish connections. In particular, using the data in the data structure 407, possible paths between a service provider interface and a RAN are determined and tried in order to establish connections. Exemplary methods of node (device) discovery, path discovery, and connection establishment implemented by switch 400 in conjunction with a hub master are described below with regards to FIGS. 5-8.

Instructions for implementing the methods described below can be implemented in software, firmware, or other processor-readable instructions. These instructions are typically stored on any appropriate processor-readable medium used for storage of processor-readable instructions or data structures. Such processor-readable media can be any available media that can be accessed by a general purpose or special purpose processor or any programmable logic device.

Suitable processor-readable media comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a programmable processor, the processor properly views the connection as a processor-readable medium. Thus, any such connection is properly termed a processor-readable medium. Combinations of the above are also included within the scope of processor-readable media.

Figure 5:
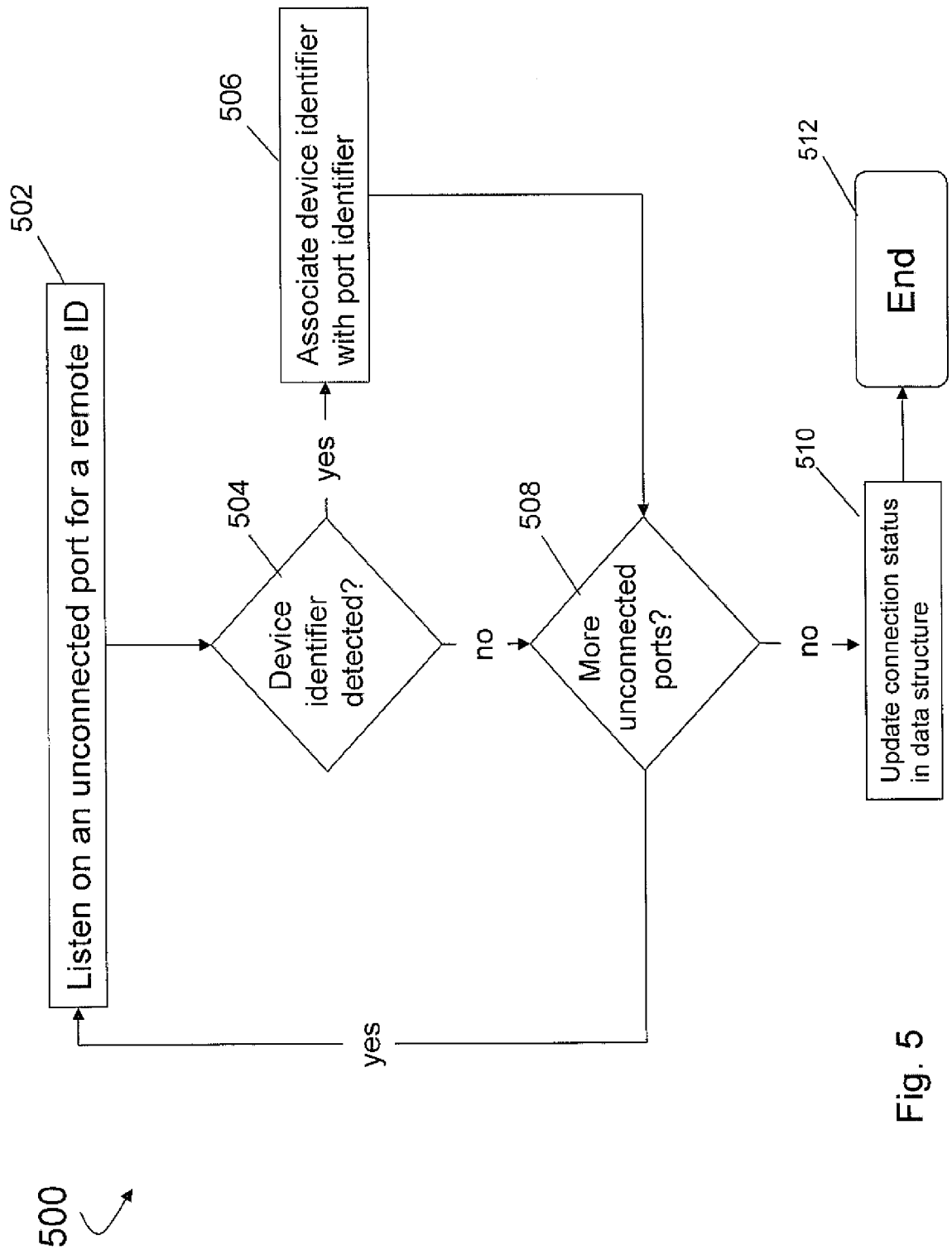
FIG. 5 is a flow chart of one embodiment of a method of discovering nodes connected to an input port.

FIG. 5 is a flow chart of one embodiment of a method 500 of discovering nodes connected to an input port. Method 500 is implemented in a system such as system 100. At 502, a crossbar switch, such as crossbar switch 106, listens on an undiscovered port for a device identifier. An undiscovered port refers to a port which is listed as "unconnected" in a data structure. That is, an undiscovered port is a port for which the crossbar switch does not have information regarding a device, if any, connected to the port. In one embodiment, the crossbar switch couples the undiscovered port to an internal DIF sink to listen for a remote ID. In this example, a device identifier is a pathtrace included in the header of a frame transmitted from a device (for example, a RAN or FSB) coupled to the crossbar. A pathtrace includes the device ID and the type of device that sourced the pathtrace.

At 504, the crossbar switch waits a pre-determined amount of time to determine if a valid pathtrace has been received. If a valid pathtrace has been received, the crossbar switch associates the received device identifier with a port identifier associated with the unconnected input port. For example, in one embodiment, the crossbar switch stores the received pathtrace in the data structure. After associating the received pathtrace with the port identifier, the crossbar switch checks if additional undiscovered ports remain to be checked at 508. Similarly, if no pathtrace is received at 504, the crossbar checks if additional ports remain to be checked at 508. For example, the crossbar switch checks the data structure to determine if any additional ports are listed as unconnected.

If there are additional undiscovered ports, method 500 returns to 502 to listen for a remote ID on another undiscovered port. At 510, if there are no additional undiscovered ports, the connection status of each undiscovered port over which a valid pathtrace was received is updated to indicate the port is connected. In addition, the data structure is updated with one or more of the port number, port direction, device ID, and device type for each undiscovered port which received a valid pathtrace. In some embodiments, the data structure is updated by a process run by a hub master, such as hub master 101.

Figure 6:
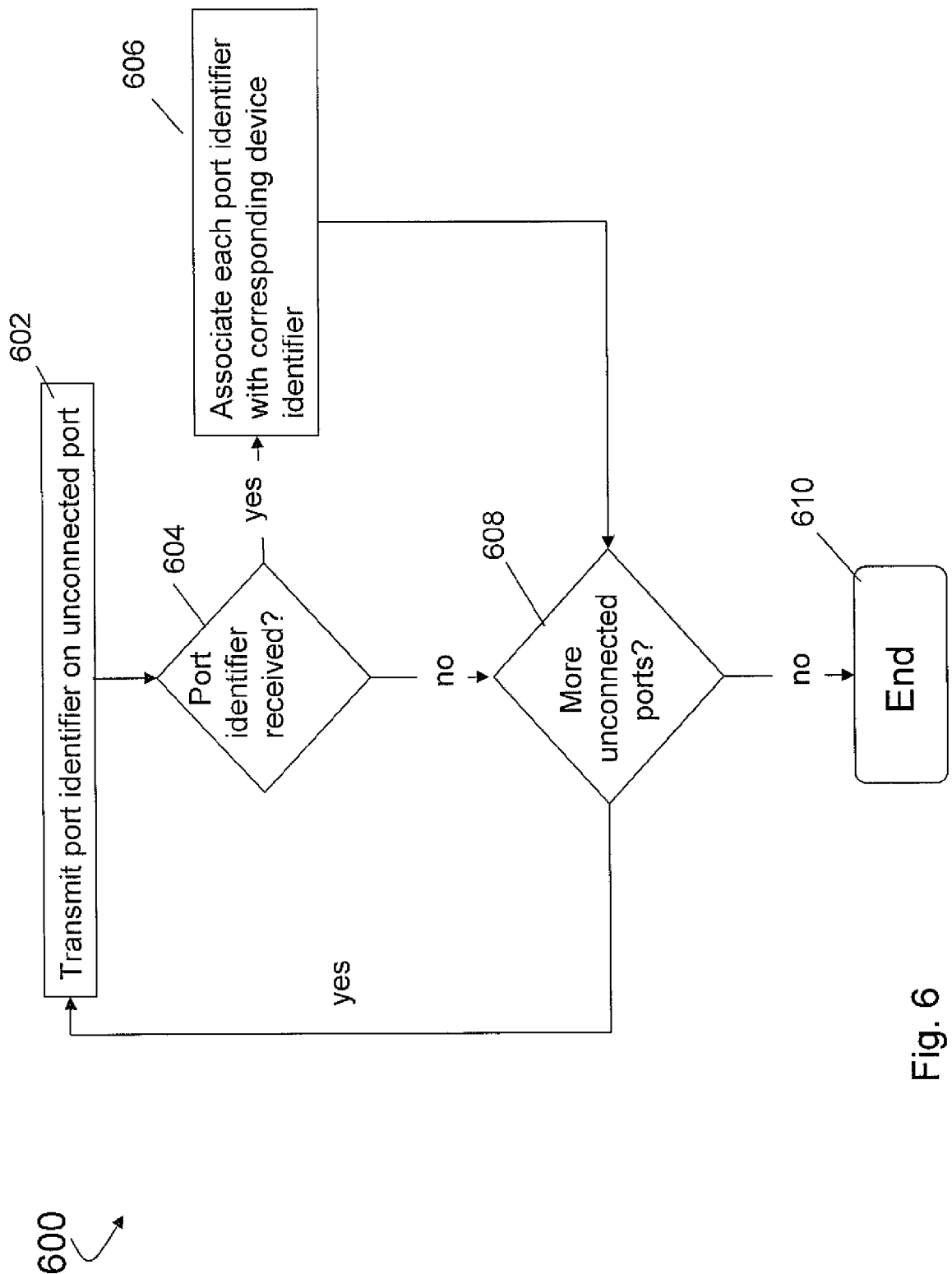
FIG. 6 is a flow chart of one embodiment of a method of discovering nodes connected to an output port.

FIG. 6 is a flow chart of one embodiment of a method 600 of discovering nodes connected to an output port. Method 600 is implemented in a system such as system 100. At 602, a crossbar switch, such as crossbar switch 106, transmits a port identifier over an undiscovered port. In one embodiment, the crossbar switch couples the unconnected port to an internal DIF source to transmit the port identifier. In this example, the port identifier is a pathtrace included in the header of a frame transmitted from the internal DIF source. The pathtrace includes the crossbar switch ID, the port number, and a timestamp.

After transmitting the port identifier, it is determined at 604 which, if any, of the port identifiers (pathtraces in this example) transmitted at 602 were received. In particular, a shared MIB object is searched for information regarding received pathtraces. As stated above, when a radio access node or other device receives a pathtrace, it stores the pathtrace information in a MIB object. The data in the MIB object is periodically passed to a hub master. In some embodiments, a process run by the hub master searches the data in the MIB object for received pathtraces. By locating pathtraces in the data in the shared MIB object, the crossbar switch is able to identify which pathtraces were received by which devices (for example, RANs and RTBs) based on the timestamp and port number in each pathtrace. In addition, in embodiments with more than one crossbar switch, the crossbar ID in the pathtrace enables distinguishing between the multiple crossbar switches.

At 606, for each pathtrace received, the crossbar switch associates the port identifier associated with the unconnected output port with a corresponding device identifier associated with the device that received the port identifier. The hub master searches the shared MIB at 606 and associates each port identifier with the corresponding device identifier and updates the data structure.

At 608, it is determined if additional undiscovered ports remain to be processed. For example, the crossbar switch searches for additional ports with the status "unconnected" in a data structure as described above. If there are additional undiscovered ports, method 600 returns to 602 where the crossbar switch transmits a port identifier including the crossbar ID, the next undiscovered port's port number, and timestamp over the next undiscovered port in the data structure. If there are no additional undiscovered ports to be processed, method 600 then terminates at 610.

In some embodiments, methods 500 and 600 described above are run concurrently. In other words, method 500 runs on the input ports while method 600 is run on the output ports. Alternatively, methods 500 and 600 are executed in a serial fashion. For example, the crossbar switch first runs method 500 on all undiscovered input ports and then runs method 600 on the undiscovered output ports.

In yet another embodiment, methods 500 and 600 are executed in a staggered fashion. For example, in some embodiments, the crossbar switch must determine which ports are input ports and which are output ports in addition to discovering device connected to the ports. In such embodiments, method 500 is run on a first undiscovered port. If the first undiscovered port is not receiving a device ID, a port ID is transmitted over the first undiscovered port as described in method 600. Then method 500 runs on a second undiscovered port, etc. In this manner, methods 500 and 600 are run on each undiscovered port before proceeding to the next undiscovered port to determine which ports are input and output ports as well as what devices are connected to the ports. Hence, in various embodiments, the crossbar switch is able to automatically determine connection status of input and output ports through methods 500 and 600.

Figure 7:
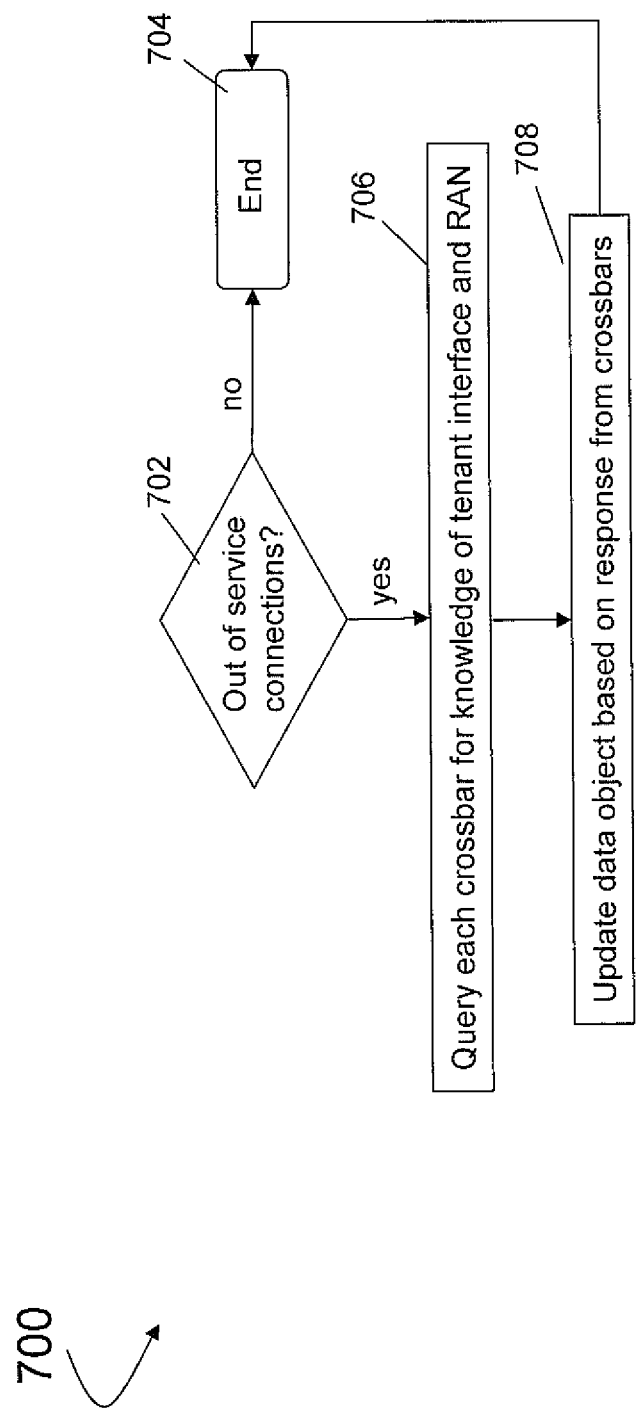
FIG. 7 is a flow chart of one embodiment of a method of discovering communication paths.

As stated above, a hub master and crossbar switch automatically discover communication paths and establish connections using the data in a data structure in the crossbar switch. FIG. 7 is a flow chart of one embodiment of a method 700 of discovering communication paths. Method 700 is implemented in a system such as system 100 above. At 702, a tenant/RAN MIB data object (a shared MIB in this example) is queried for "out-of-service" connections. In other words, a tenant/RAN MIB data object contains a list of tenant identifiers, which identify each tenant interface in the system, a list of RAN identifiers, which identify each RAN in the system, and the connection status between individual tenant interfaces and RANs. An "in-service" connection status indicates that a connection path has been successfully established between a particular tenant interface and RAN, whereas an "out-of-service" connection status indicates that a connection path has not been successfully established.

In this embodiment, a process run by a hub master, such as hub master 101, queries the tenant/RAN MIB data object to identify "out-of-service" connections. If no "out-of-service" connections are identified, method 700 terminates at 704. If "out-of-service" connections are identified, the hub master process queries each crossbar switch in the system, at 706, to determine which if any of the crossbar switches has information regarding the tenant interface and the RAN for each of the identified "out-of-service" connections. In particular, the hub master process queries each crossbar switch to find crossbar switches having information regarding an RTB, FSB, RUC, and RDC in order to complete a connection between the particular tenant interface and RAN for each identified "out-of-service" connection.

If a crossbar switch is aware of only the tenant interface or the RAN, the connection cannot be established unless support for cable daisy chains between crossbar switches, as described above, is enabled. If cable daisy chains are supported, the connection can be established if one crossbar switch has information regarding the tenant interface and another daisy chain coupled crossbar switch has information regarding the RAN. At 708, the hub master updates the tenant/RAN MIB data object with possible connection paths based on the response from the crossbar switches. Method 700 then terminates at 704.

Figure 8:
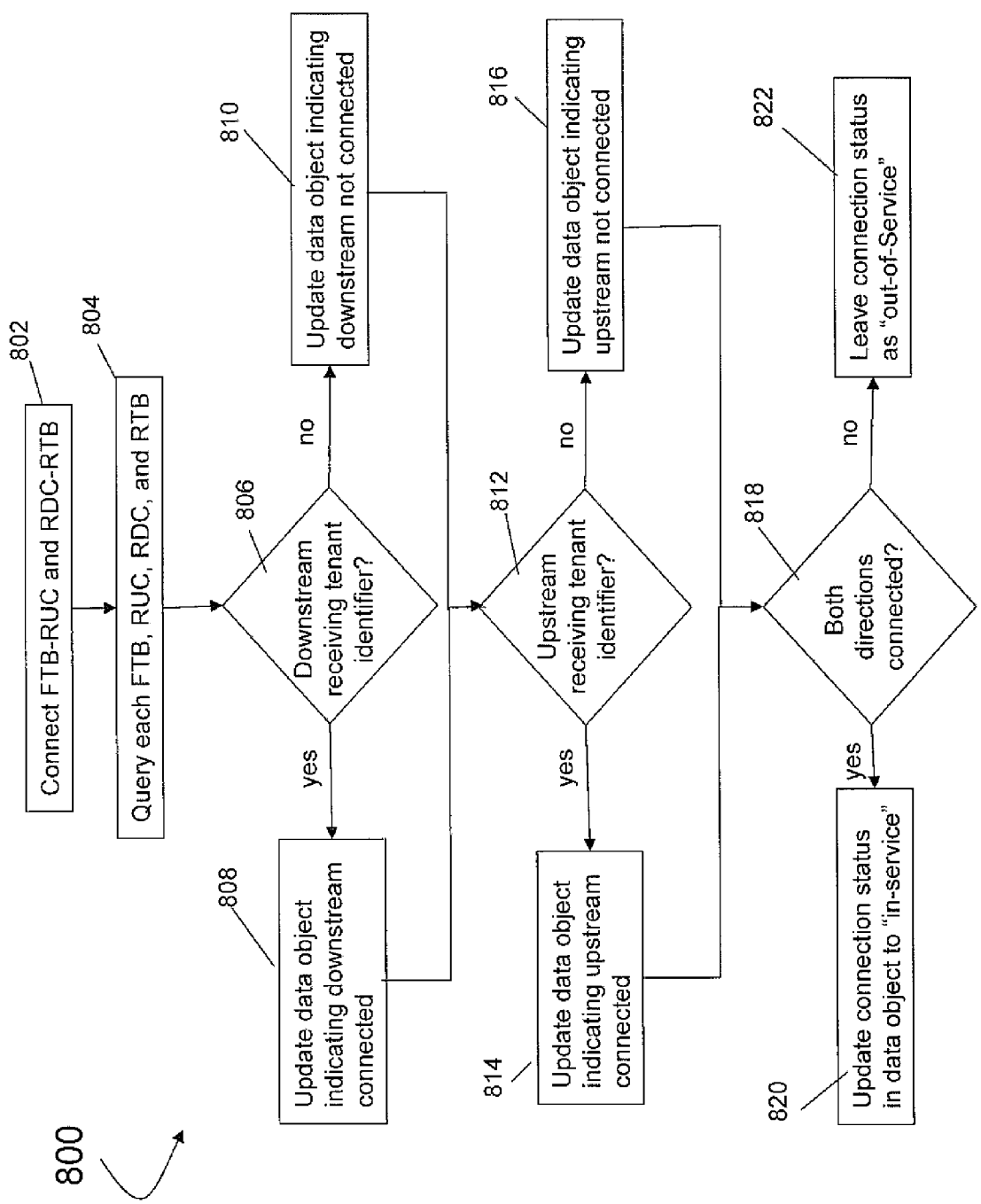
FIG. 8 is a flow chart of one embodiment of a method of establishing connections.

FIG. 8 is a flow chart of one embodiment of a method 800 of establishing connections based on possible connection paths identified in method 700. At 802, a process in a hub master selects a path based on the information from the crossbar switches for a tenant/RAN connection and instructs the appropriate crossbar switch to make the connections. In particular, the crossbar switch connects the FSB corresponding to the tenant interface with the RUC in the RAN for the downstream connection and the corresponding RTB with the RDC in the RAN for the upstream connection. It should be noted that the crossbar switch responsible for the FSB-RUC connection is not necessarily the same crossbar switch responsible for the RTB-RDC connection.

At 804, each device (that is, RUC, RDC, FSB, RTB) used for the upstream and downstream connections is queried. In particular, each device is queried to determine if the tenant identifier (a pathtrace in this example) is being received. For example, each device is queried using a shared MIB object in some embodiments. At 806, it is determined if each device in the downstream (that is, the FSB in the hub and RUC in the RAN) is receiving the tenant identifier. If each device is receiving the tenant identifier, the tenant/RAN data object is updated indicating that the downstream connection is established at 808. If each device is not receiving the tenant identifier, the tenant/RAN data object is updated indicating that the downstream path connection is not established at 810.

At 812, it is determined if each device in the upstream path (that is, the RTB in the hub and RDC in the RAN) is receiving the tenant identifier. If each device is receiving the tenant identifier, the tenant/RAN data object is updated indicating that the upstream connection is established at 814. If each device is not receiving the tenant identifier, the tenant/RAN data object is updated indicating that the upstream path connection is not established at 816.

At 818, it is determined if both the upstream and downstream path connections are established. If both paths are established, the hub master updates the tenant/RAN data object to indicate the status of the connection as "in-service" at 820. If both paths are not established, the hub master leaves the connection status as "out-of-service" at 822.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A wireless communications system comprising:
   a hub;
   a plurality of radio access nodes, wherein each of the plurality of radio access nodes is coupled to the hub via a respective communication link;
   wherein the hub comprises:
      a plurality of forward devices that produce digitized versions of downstream analog radio frequency signals received from a plurality service provider interfaces;
      a plurality of reverse devices that produce reconstructed versions of upstream analog radio frequency signals for transmission to the plurality of service provider interfaces based on digitized version of the upstream analog radio frequency signals received from the plurality of radio access nodes;
      a plurality of transport interfaces to couple the hub to the plurality of communication links; and
      a switch having a plurality of ports communicatively coupled to the hub forward devices, the hub reverse devices, and the transport interfaces, wherein the switch selectively routes the digitized versions of the downstream analog radio frequency signals and the digitized versions of the upstream analog radio frequency signals among the plurality of ports;
   wherein the plurality of ports comprises a plurality of input ports and plurality of output ports;
   wherein the switch listens for a device identifier on at least one of the plurality of input ports to determine if a device is communicatively coupled to the at least one of the plurality of input ports; and
   wherein the switch transmits a respective port identifier over at least one of the plurality of output ports and, thereafter, searches a copy of a shared data structure maintained at the hub to determine if a device is communicatively coupled to the at least one of the plurality of output ports of the switch;
   wherein the device is one of the plurality of radio access nodes, one of the plurality of forward devices, or one of the plurality of reverse devices;
   wherein when the respective port identifier is received, the device which received the respective port identifier is configured to store the respective port identifier in a respective local copy of the shared data structure;
   wherein the copy of the shared data structure maintained at the hub is updated based on information in the respective local copy of the shared data structure;
   wherein the switch searches for the respective port identifier in the copy of the shared data structure maintained at the hub to determine which device received the respective port identifier.

2. The system of claim 1:
   wherein the plurality of forward devices produce the digitized versions of the downstream analog radio frequency signals by downconverting the downstream analog radio frequency signals and digitizing the resulting downconverted downstream analog radio frequency signals; and
   wherein each reverse device produces the respective reconstructed upstream analog radio frequency signals from the digitized versions of the upstream analog radio frequency signals that are received by the respective reverse device by digital-to-analog converting the digitized versions of the upstream analog radio frequency signals received by the respective reverse device and upconverting the resulting analog signals in order to produce the respective reconstructed upstream analog radio frequency signals.

3. The system of claim 1, wherein each radio access node comprises:
   a RAN transport interface to couple the respective radio access node to a respective communication link;
   a RAN forward device to produce reconstructed downstream analog radio frequency signals from the digitized versions of the downstream analog radio frequency signals received by the respective RAN transport interface; and
   a reverse RAN device to produce digitized versions of the upstream analog radio frequency signals received at the radio access node for transmission by the respective RAN transport interface to the hub.

4. The system of claim 3:
   wherein the forward RAN device produces the reconstructed downstream analog radio frequency signals from the digitized versions of the downstream analog radio frequency signals received by the respective RAN transport interface by digital-to-analog converting the digitized versions of the downstream analog radio frequency signals received by the respective RAN transport interface and upconverting the resulting respective analog signals in order to produce the reconstructed downstream analog radio frequency signals; and
   wherein the reverse RAN device produces digitized versions of the upstream analog radio frequency signals received at the radio access node by downconverting the upstream analog radio frequency signals and digitizing the resulting downconverted upstream analog radio frequency signals.

5. The system of claim 1, wherein the hub receives the downstream analog radio frequency signals from at least one service provider interface, wherein at least one service provider interface comprises one of an interface to one or more of a base transceiver station (BTS), a repeater, a bi-directional amplifier, and a base station hotel.

6. The system of claim 1, wherein the device identifier comprises a pathtrace in a header of a received frame.

7. The system of claim 1, wherein the switch associates a received device identifier with a port number associated with the input port on which the received device identifier was received.

8. The system of claim 1, wherein the shared data structure is a shared MIB object.

9. The system of claim 1, wherein the port identifier comprises at least: a timestamp and a port number of the output port over which the port identifier is transmitted.

10. The system of claim 1, wherein the switch listens for a device identifier on at least one of the plurality of input ports while substantially simultaneously transmitting a respective port identifier over at least one of the plurality of output ports.

11. The system of claim 1, wherein the hub further comprises a hub master central processing unit (CPU), the hub master CPU is configured to query a tenant/RAN data object to identify out-of-service connections and to query the switch for knowledge of a plurality of devices for connecting a tenant interface and associated radio access node for each identified out-of-service connection.

12. The system of claim 11, wherein the hub master CPU is further configured to select at least one possible connection path based on a response from the switch, instruct the switch to make the selected connection path, and query each device used in the connection to determine if the connection has been established successfully.

13. A hub for communicating with a plurality of radio access nodes over a plurality of communication links, the hub comprising:
    a plurality of forward devices that produce digitized versions of downstream analog radio frequency signals received from a plurality service provider interfaces;
    a plurality of reverse devices that produce reconstructed versions of upstream analog radio frequency signals for transmission to the plurality of service provider interfaces based on digitized versions of the upstream analog radio frequency signals received from the plurality of radio access nodes;
    a plurality of transport interfaces to couple the hub to the plurality of communication links; and
    a switch having a plurality of ports communicatively coupled to the hub forward devices, the hub reverse devices, and the transport interfaces, wherein the switch selectively routes the digitized versions of the downstream analog radio frequency signals and the digitized versions of the upstream analog radio frequency signals among the plurality of ports;
    wherein the plurality of ports comprises a plurality of input ports and plurality of output ports;
    wherein the switch listens for a device identifier on at least one of the plurality of input ports to determine if a device is communicatively coupled to the at least one of the plurality of input ports; and
    wherein the switch transmits a respective port identifier over at least one of the plurality of output ports and, thereafter, searches a copy of a shared data structure maintained at the hub to determine if a device is communicatively coupled to the at least one of the plurality of output ports;
    wherein the device is one of the plurality of radio access nodes, one of the plurality of forward devices, or one of the plurality of reverse devices;
    wherein the copy of the shared data structure maintained at the hub is updated based on information in a respective local copy of the shared data structure maintained at the device which received the respective port identifier;
    wherein the switch searches for the respective port identifier in the copy of the shared data structure maintained at the hub to determine which device received the respective port identifier.

14. A method comprising:
    scanning an unconnected input port in a switch, wherein scanning the unconnected input port comprises:
        listening for a device identifier on the unconnected input port; and
        if the device identifier is detected on the unconnected input port, associating the device identifier with a port identifier associated with the unconnected input port; and
    scanning an unconnected output port in the switch, wherein scanning the unconnected output port comprises:
        transmitting on the unconnected output port a port identifier associated with the unconnected output port;
        determining if a device received the port identifier by searching in a copy of a shared data structure maintained at a hub for the port identifier; and
        if a device received the port identifier, associating the port identifier associated with the unconnected output port with a device identifier associated with the device that received the port identifier;
        wherein the copy of the shared data structure maintained at the hub is updated based on information in a respective local copy of the shared data structure maintained at the device which received the respective port identifier.

15. The method of claim 14, wherein listening for a device identifier comprises listening for a pathtrace in a header of a received frame.

16. The method of claim 14, wherein listening for a device identifier comprises coupling the undiscovered input port to an internal digital intermediate frequency (DIF) sink.

17. The method of claim 14, wherein associating the device identifier with the port identifier associated with the unconnected input port comprises updating the shared data structure to indicate that the device identifier is associated with the port identifier associated with the unconnected input port.

18. The method of claim 14, wherein transmitting on the unconnected output port the port identifier associated with the unconnected output port comprises coupling the unconnected output port to an internal digital intermediate frequency (DIF) source.

19. The method of claim 14, wherein scanning the unconnected output port in the switch comprises scanning the unconnected output port substantially simultaneously with scanning the unconnected input port.

20. The method of claim 14, wherein scanning the unconnected output port comprises scanning the unconnected output port after scanning the unconnected input port.

21. The method of claim 14, wherein transmitting a port identifier comprises transmitting a pathtrace in a header of a frame transmitted from the switch.

22. The method of claim 21, wherein transmitting a pathtrace comprises transmitting a pathtrace containing a switch identifier, an output port number associated with the unconnected output port, and a timestamp.

23. The method of claim 22, wherein determining if a device received the port identifier associated with the unconnected output port comprises searching the shared data structure for the timestamp and the output port number.

24. The method of claim 14, further comprising:
    querying a tenant/RAN data object to identify an out-of-service connection between a tenant interface and a radio access node (RAN);
    if an out-of-service connection is identified, querying the switch for knowledge of a plurality of devices for connecting the tenant interface and the RAN; and
    based on the response to the query of the switch, updating the tenant/RAN data object with one or more possible connection paths using the plurality of devices.

25. The method of claim 24, further comprising:
    selecting one of the one or more possible connection paths;

instructing the switch to connect the plurality of devices of the selected connection path;

querying each of the plurality of devices used in an upstream portion of the connection path to determine if a tenant identifier is being received;

querying each of the plurality of devices used in a downstream portion of the connection path to determine if the tenant identifier is being received;

if the tenant identifier is being received at each device in the upstream portion, updating the tenant/RAN data object to indicate that the upstream portion is connected;

if the tenant identifier is being received at each device in the downstream portion, updating the tenant/RAN data object to indicate that the downstream portion is connected;

if both the upstream and downstream portions are connected, updating the tenant/RAN data object to indicate that the connection path is in service.

26. The method of claim 25, wherein instructing the switch to connect the selected connection path comprises:

instructing the switch to connect a hub forward device corresponding to the tenant to a RAN forward device in the RAN; and instructing the switch to connect a reverse device corresponding to the tenant to a RAN reverse device in the RAN.

27. A method comprising:

listening for a device identifier on an unconnected port;

if the device identifier is detected, storing the device identifier and a port number associated with the unconnected port in a data structure;

if the device identifier is not detected, transmitting a port identifier associated with the unconnected port over the unconnected port;

determining if a device received the port identifier by searching in a copy of a shared data structure maintained at a hub for the port identifier; and if a device received the port identifier, storing a port number associated with the unconnected port and a device identifier associated the device that received the port identifier in the data structures;

wherein the copy of the shared data structure maintained at the hub is updated based on information in a respective local copy of the shared data structure maintained at the device which received the respective port identifier.

28. The method of claim 27, wherein listening for a device identifier comprises listening for a pathtrace in a header of a received frame.

29. The method of claim 27, wherein listening for a device identifier comprises coupling the unconnected port to an internal digital intermediate frequency (DIF) sink.

30. The method of claim 27, wherein storing the device identifier and the port number associated with the unconnected port in the data structure comprises storing the device identifier and the port number associated with the unconnected port in a shared MIB object.

31. The method of claim 27, wherein transmitting the port identifier associated with the unconnected port over the unconnected port comprises coupling the unconnected port to an internal digital intermediate frequency (DIF) source.

32. The method of claim 27, wherein transmitting the port identifier associated with the unconnected port over the unconnected port comprises transmitting a pathtrace in a header of a frame transmitted from the switch.

33. The method of claim 32, wherein the pathtrace comprises an identifier associated with the switch, a port number associated with the unconnected port, and a timestamp.

34. The method of claim 33, wherein determining if a device received the port identifier comprises searching the shared data structure for the timestamp and the port number associated with the unconnected port.

35. The method of claim 27, further comprising:

querying a tenant/RAN data object to identify an out-of-service connection between a tenant interface and a radio access node (RAN);

if an out-of-service connection is identified, querying the switch for knowledge of a plurality of devices for connecting the tenant interface and RAN; and based on the response to the query of the switch, updating the tenant/RAN data object with one or more possible connection paths using the plurality of devices.

36. The method of claim 35, further comprising:

selecting one of the one or more possible connection paths;

instructing the switch to connect the plurality of devices of the selected connection path;

querying each of the plurality of devices used in an upstream portion of the connection path to determine if a tenant identifier is being received;

querying each of the plurality of devices used in a downstream portion of the connection path to determine if the tenant identifier is being received;

if the tenant identifier is being received at each device in the upstream portion, updating the tenant/RAN data object to indicate that the upstream portion is connected;

if the tenant identifier is being received at each device in the downstream portion, updating the tenant/RAN data object to indicate that the downstream portion is connected;

if both the upstream and downstream portions are connected, updating the tenant/RAN data object to indicate that the connection path is in service.

37. The method of claim 36, wherein instructing the switch to connect the selected connection path comprises:

instructing the switch to connect a forward device in the hub corresponding to the tenant to a forward device in the RAN; and instructing the switch to connect a reverse simulcast transmission block corresponding to the tenant to a RAN down-converter in the RAN.

38. A switch comprising:

a plurality of input ports;

a plurality of output port; and a programmable controller to:

initiate listening on at least one of the plurality of input ports for a device identifier to determine if a device is communicatively coupled to the at least one input port;

initiate transmitting a port identifier over at least one of the plurality of output ports; and determine if a device is communicatively coupled to the at least one output port by searching for the port identifier in a copy of a shared data object maintained at a hub where the switch is located to identify if a device received the port identifier;

wherein the copy of the shared data structure maintained at the hub is updated based on information in a respective local copy of the shared data structure maintained at the device which received the respective port identifier.

39. The switch of claim 38, wherein the device identifier is a pathtrace in a header of a received frame.

40. The switch of claim 38, further comprising a memory block, wherein the programmable controller is configured to store in a data structure in the memory block the device identifier and a port number associated with the at least one input port.

41. The switch of claim 38, wherein the data structure is the shared data object.

42. The switch of claim 38, wherein the port identifier comprises at least the port number of the at least one output port over which the port identifier is transmitted and a timestamp.

43. The switch of claim 38, wherein the programmable controller is configured to initiate listening for a device identifier on at least one of the plurality of input ports while substantially simultaneously initiating transmitting a port identifier over at least one of the plurality of output ports.

* * * * *